June 14, 1955 T. M. GLUYAS, JR 2,710,894

MULTI-TUBE CAVITY RESONATOR CIRCUIT

Filed Jan. 31, 1950 3 Sheets-Sheet 1

INVENTOR
Thomas M. Gluyas, Jr.
BY
Charles H. Brown
ATTORNEY

June 14, 1955 T. M. GLUYAS, JR 2,710,894

MULTI-TUBE CAVITY RESONATOR CIRCUIT

Filed Jan. 31, 1950. 3 Sheets-Sheet 2

INVENTOR
Thomas M. Gluyas, Jr.
BY
Charles H. Brown
ATTORNEY

June 14, 1955 T. M. GLUYAS, JR 2,710,894

MULTI-TUBE CAVITY RESONATOR CIRCUIT

Filed Jan. 31, 1950 3 Sheets-Sheet 3

INVENTOR
Thomas M. Gluyas, Jr.
BY
Charles H. Brown
ATTORNEY

United States Patent Office 2,710,894

Patented June 14, 1955

2,710,894

MULTI-TUBE CAVITY RESONATOR CIRCUIT

Thomas M. Gluyas, Jr., Collingswood, N. J., assignor to Radio Corporation of America, a corporation of Delaware Application January 31, 1950, Serial No. 141,547

8 Claims. (Cl. 179—171)

This invention relates to high frequency circuits employing a plurality of vacuum tubes coupled to one another in electrical parallel relation, and more particularly to such an arrangement in which the vacuum tubes share common cavity resonator circuits. This application is a continuation-in-part of my copending application Serial No. 114,441, filed September 7, 1949.

The system of the invention, which may be an amplifier, frequency multiplier or oscillation generator, is particularly useful at high frequencies in the range of 200–1500 megacycles for amplifying or producing relatively high power, and has been successfully employed in a television transmitter operating in the ultra high frequency range.

A prior power amplifier circuit arrangement has employed a plurality of vacuum tubes within and surrounding the axis of a cylindrical cavity resonator having an effective electrical radius of a quarter wavelength at the mean operating frequency. One difficulty which is experienced with this prior arrangement is that the vacuum tubes must be positioned close to the center axis of the cavity resonator at the location of maximum electric field in order for the system to operate properly. The result of this arrangement is that during operation, the displacement currents are concentrated on one side of each tube in the common cavity resonator, thus concentrating the high displacement currents over a limiting portion of each vacuum tube. Such high current concentrations result in uneven heating of the vacuum tube electrode seals and tend to cause failures of the tubes, and an increase in losses within the tubes with a consequent reduction in power output.

An object of the present invention is to enable the efficient production and/or amplification of high frequencies at relatively high power in a multi-tube arrangement employing a common cavity resonator circuit, with a substantially uniform current distribution in the vacuum tube seals and a minimum of radio frequency power loss.

Another object is to provide a multi-tube circuit arrangement of the foregoing type equipped with individual tuning arrangements for the different vacuum tubes, thereby assuring substantially equal and uniform operation of all vacuum tubes.

Still another object of the invention is to provide a multi-tube circuit in association with a common cavity resonator in which the cavity resonator has the maximum diametrical dimension for assuring the minimum losses and enabling the use of the largest number of vacuum tubes, while at the same time avoiding the creation of spurious radio frequency fields which might tend to create circumferentially travelling waves.

In brief, the present invention comprises a cylindrical or annular type cavity resonant structure having input and output resonant cavities with a plurality of vacuum tubes symmetrically positioned around the axis of the structure and entering the interior of both resonant cavities. The effective radius of the output resonant cavity has a length which is electrically one-half wavelength at the mean operating frequency. The input and the output resonant cavities are provided with separate annular tuning adjustment sliders. Each vacuum tube has individual thereto a grid excitation coaxial line tuning section, so arranged that all of the grid excitation tuners for all of the vacuum tubes are symmetrically arranged in a circle around the axis of the cavity resonant structure. Along the axis of the cavity resonant structure on one side thereof there is provided an input radio frequency current carrying coaxial line, and on the other side thereof an output radio frequency current carrying line.

In accordance with one aspect of the present invention, neutralization is provided for the radio frequency energy which is unavoidably coupled between the resonant input and output cavities through the grid-anode interelectrode capacitances of the vacuum tubes. This neutralization is achieved by a proper selection of the number and dimensions and spacing of the contact fingers engaging a common wall between the input and output cavities and contacting the screen grid electrodes of the vacuum tubes. There are as many apertures in the common wall between the input and output cavities as there are vacuum tubes to be accommodated thereby, and each aperture is provided with an annular arrangement of spaced contact fingers for contacting the screen grid electrode of the vacuum tube seated in that particular aperture. The proper spacing of these contact fingers which surround the various apertures in this common wall, and which apertures are designed to accommodate the vacuum tubes, assures the desired amount of energy transfer between the input and output cavities, appearing in the spaces between the fingers, necessary to achieve the desired neutralization. Thus the electrostatic couplings due to the interelectrode capacitances of the vacuum tubes is neutralized by the electromagnetic couplings between the input and output cavity resonators occurring through the spaces between the contact fingers. This electromagnetic coupling around each contact finger is created by the current flowing through that contact finger and this current is common to both the input and output circuits.

Other objects and aspects of the present invention will appear from a reading of the following description, in conjunction with drawings, wherein:

Fig. 1*a* illustrates the system of the invention embodied in a radio frequency tripler stage useful in the transmitter of a televison system;

Fig. 1*b* illustrates the system of the invention embodied in a radio frequency amplifier stage useful in the transmitter of a television system. The stages of both Figs. 1*a* and 1*b* employ the same general principles of operation. In practice, the amplifier of Fig. 1*b* can be driven from the output of the tripler stage of Fig. 1*a*;

Figure 1A:
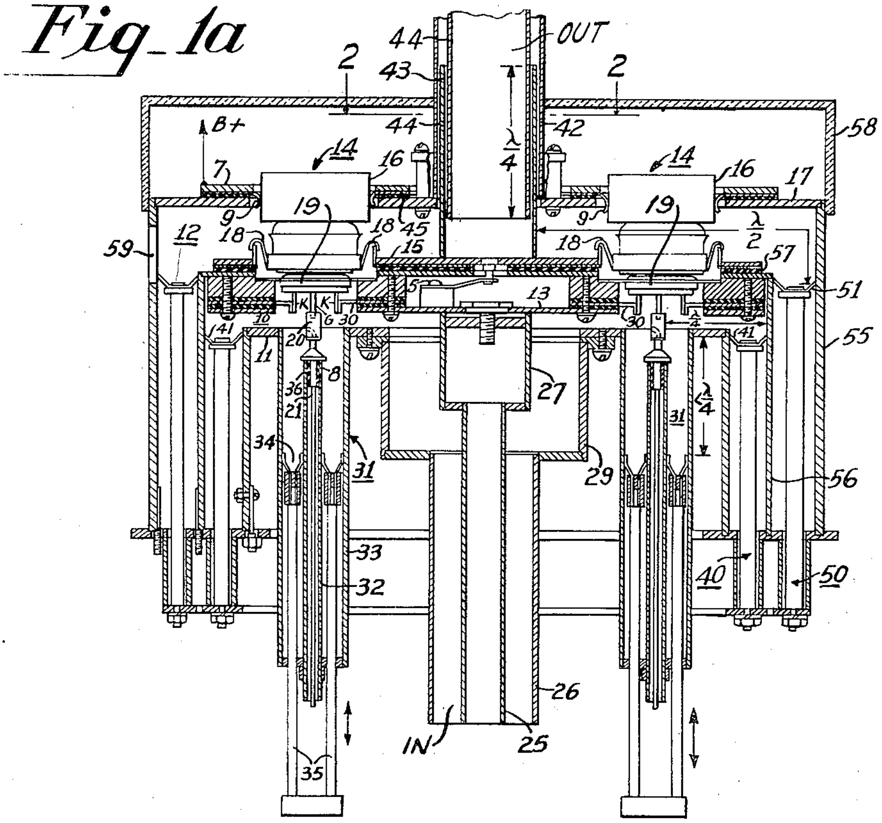
Figure 4C:
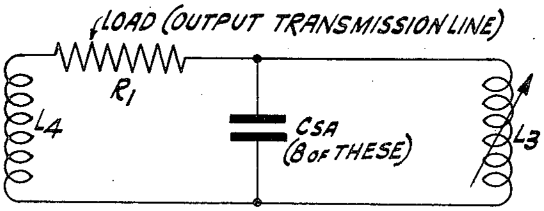
Figure 1B:
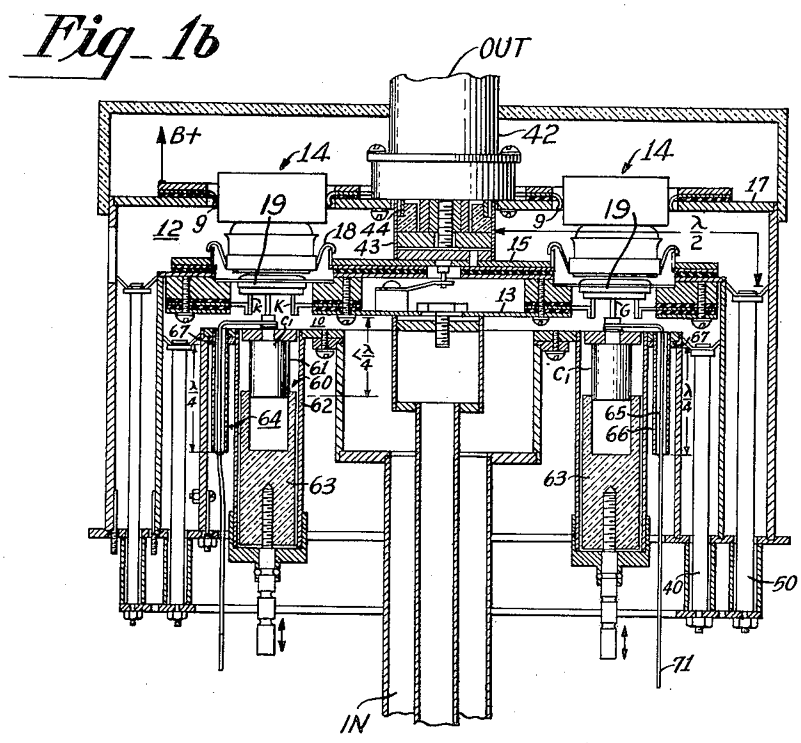
Figure 4A:
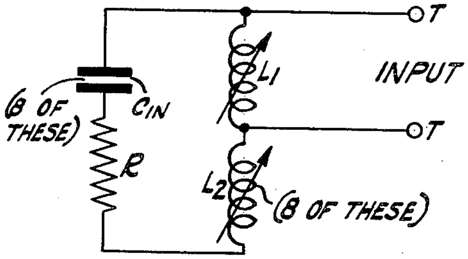
Figure 4B:
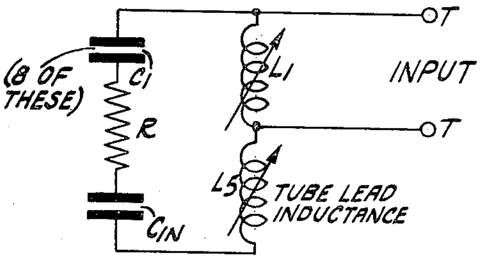

Figs. 4*a* and 4*b* illustrate the equivalent electrical input or grid circuits for the tripler and amplifier stages of Figs. 1*a* and 1*b*, respectively; and Fig. 4*c* illustrates the equivalent electrical circuit for the anode circuit of both the tripler and amplifier stages of Figs. 1*a* and 1*b*.

Figs. 1*a* and 1*b* are are very similar in construction and operation except for minor differences which enable the systems thereof to perform different functions. The same parts in both of these figures are designated by the same reference numerals.

Figure 2:
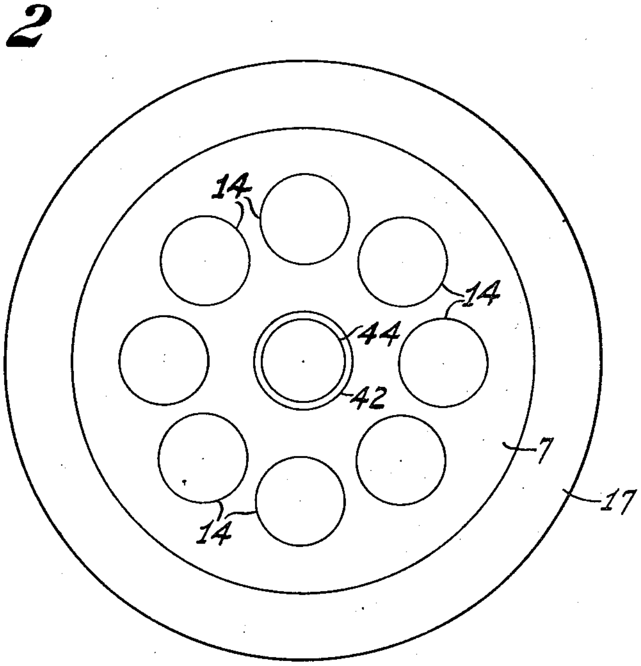
Fig. 2 is a plan view or cross section of the system of Fig. 1*a* taken along the lines 2—2. A similar view will appear as the plan view of Fig. 1*b*, as seen looking down upon the anodes of the vacuum tubes.

Referring to Fig. 1*a* in more detail, there is shown a longitudinal cross-sectional view of a frequency multiplier or tripler stage embodying the novel principles of the invention. This tripler stage includes a cylindrical or annular metallic cavity resonator construction having an input cavity resonator 10 defined by a lower wall 11 and upper wall 13, and an output cavity resonator 12 defined by a lower wall 15 and an upper wall 17. The upper wall 13 of the input cavity and the lower wall 15 of the output cavity are coupled together by bypass condensers in a manner to be described later so that in effect both walls 13 and 15 can be considered a common wall between the input and output cavity resonators The top wall 17 of the output cavity, and the walls 13 and 15 are provided with spaced holes symmetrically arranged around the axis of the cavity resonator structure in order to seat therein a plurality of vacuum tubes 14, in an arrangement sometimes referred to as a cluster of tubes. These vacuum tubes are shown as tetrodes and may be of 4X15OA type with the anode radiator fins 16 seated in the holes of the top wall 17 to make good electrical connection therewith and close these holes. It should be noted that each of the holes in the upper wall 17 is provided with spaced metallic contact fingers 9 arranged in the form of an annulus for engaging the radiator fins. These contact fingers 9 are connected to metallic shims in direct contact with a metallic plate 7 to which the anode potential B+ is supplied. A clearer understanding of the appearance of these tubes in the cavity resonator structure may be had by reference to Fig. 2 showing the top or plan view of the tripler stage of Fig. 1*a*.

The screen electrode of each vacuum tube 14 is seated within the hole in the wall 15 and by virtue of a metallic disc engages a plurality of physically spaced metallic spring contact fingers 18 arranged in a circle for direct electrical contact with the wall 15. The wall 15 in engagement with contact fingers 18 is provided with a screen grid binding post 5, as shown. A socket 19 is provided in this hole for accommodating the cathode, cathode heater and grid electrode pins of the vacuum tube. Although only two cathode leads K are shown beneath each socket, in practice there are four such cathode leads electrically connected together for reducing the lead inductance. The grid pin G of each socket also appears on the under side thereof and is connected through a flexible metallic connection 20 to the lead 21 furnishing grid bias for the tube.

The excitation power is supplied to the input cavity resonator 10 by means of the coaxial line IN positioned on one side of the cavity resonator structure along the axis thereof, and having an inner conductor 25 and an outer conductor 26. The upper terminals of this input line IN are flared or stepped at 27 and 29 in order to terminate this line as closely as possible to the terminals of the vacuum tubes. Thus, the inner conductor 25 is flared at 27 while the outer conductor 26 is flared at 29. The spacing between flared portions 27 and 29 is so chosen as to match the impedance presented by the input terminals of the plurality of vacuum tubes 14. It should be noted that the inner conductor 25 and its flared portion 27 is directly connected to wall 13 and then through a bypass capacitor arrangement 30 to the cathode leads K. The outer conductor 26 and its flared portion 29 is directly connected to the bottom wall 11 and then through individual grid tuning sections 31 to the grids of the different vacuum tubes. Each vacum tube has individual thereto a grid or input tuner 31 in the form of a coaxial line having an inner conductor 32 and an outer conductor 33 which are directly connected together by a short circuiting slider 34, in turn, controlled by a piston arrangement 35. The distance between the lower wall 11 of the input cavity resonator and the top of the slider 34 is less than one-quarter wavelength at the mean operating frequency in order to simulate an inductance. Although the flared portions 27 and 29 have been shown as cylindrical, these portions may in fact be conical with the narrowest portions thereof terminating on the conductors 25 and 26.

The flexible connection 20 in the grid bias connection is composed of a thin cylindrical copper tubing having its axis perpendicular to the axis of the input tuner 31. This connects the grid pin G to the grid bias connection 21 and is such that it permits a slight displacement longitudinally and laterally with the movement of the grid terminal of the vacuum tube socket. The grid bias connection 21 is bypassed to inner conductor 32 of the grid tuner by means of a bypass condenser 36 comprising an insulating sleeve 8 positioned between the conductor 32 and the grid bias connection 21 at its upper end.

The input cavity resonator 10 is tuned by an annular piston-like tuner 40 having an annular short-circuiting contact slider 41. It should be noted that the input cavity in effect is coupled between the cathodes and control grids of the different vacuum tubes.

The output transmission line is designated OUT and comprises an outer conductor 42 and an inner conductor comprising portions 43 and 44, arranged along the axis of the cavity resonator structure and in substantially the same straight line with the input line but on the opposite side of the cavity resonator structure with respect thereto. Outer conductor 42 of the output line is coupled to the anodes of the vacuum tubes 14 through bypass capacitors 45. The portion 43 forming part of the inner conductor of the output line is, in effect, a choke joint and connects directly with wall 15 engaging the screen grids of the vacuum tubes, as shown. The portion 44 of the inner conductor of the output line extends to a suitable utilization circuit which, in this particular case, may be the input transmission line of the amplifier stage of Fig. 1*b*. It should be noted that the outer conductor 42 and the portions 43 and 44 of the inner conductor are physically spaced from one another. The choke joint 43 is a metallic tube having a length approximately one-quarter of a wavelength at the mean operating frequency. The purpose of this choke joint 43 is to remove the direct current screen potential from that portion 44 of the inner conductor of the output transmission line carrying the radio frequency output energy to the utilization circuit. In practice, that portion of the output transmission line appearing above the choke joint 43 is a variable impedance transmission line having one conductor slotted and the other provided with numerous projections extending toward the slotted conductor, one of these conductors being rotatable about the axis of the output line section to assume a desired position. Such rotation of the variable impedance line results in a variation of the characteristic impedance of the transmission line section, and is, in effect, a quarter wavelength transformer which matches the impedance between the circuit elements which it connects. Such a variable impedance transmission line is described in my copending application Serial No. 114,441, supra.

The output cavity resonator 12 is provided with an annular output piston type tuner 50 having an annular short-circuiting slider 51 for adjusting the resonant frequency of the output cavity. It should be noted that the outer cylindrical wall of the output cavity, which is designated 55 is a continuation of the upper wall 17, while the inner cylinder wall 56 of the output cavity resonator is capacitively coupled by a bypass condenser arrangement 57 to the screen grid electrodes of the vacuum tubes 14.

The effective electrical length of the radius of the output cavity resonator 12 measuring from the choke joint 43 of the output transmission line to that portion of the cylindrical wall 55 in contact with the short-circuiting cylinder 51 is one-half wavelength at the mean operating frequency, as shown. The vacuum tubes 14 are seated in holes substantially midway between the output transmission line and the outer cylindrical wall 55 of the output cavity resonator. Actually, the diameter of the circle in which the vacuum tubes lie is the geometric mean between the diameters of the cylindrical wall 55 of the output cavity resonator and the diameter of the choke joint 43. By virtue of this positioning of the vacuum tubes, there is substantially uniform current distribution around the periphery of the vacuum tube seals, thus overcoming any possible concentration of high frequency current at any one particular point on the tube seals and minimizing radio frequency power losses therein.

There is an unavoidable coupling between the input cavity resonator 10 and the output cavity resonator 12 through the interelectrode capacities of the vacuum tubes. This coupling is electrostatic and is neutralized by electromagnetic coupling between the input and output cavities occurring between the spaced contact fingers 18 engaging the screen grids and the central wall 15. These spaced contact fingers are of such number and have such dimensions and are so spaced that due to the current flow therein the electromagnetic energy between the fingers is sufficient to neutralize the aforementioned undesired electrostatic coupling. In practice, the required dimension and spacing and the number of the contact fingers 18 to achieve this neutralization are arrived at by a trial and error process. One way in which this can be done is to arbitrarily select a number of contact fingers 18 with a suitable spacing therebetween for the screen grids of the different vacuum tubes, and then apply power to the input cavity resonator from the input line IN. Observance should then be taken of the magnitude of the electric field in the output cavity resonator by means of a probe containing a crystal rectifier inserted into the output cavit. Adjustments are then made in the dimensions and spacing of the contact fingers 18 to minimize the magnitude of the field in the output cavity. The result should be a plurality of annular constructions of contact fingers 18 for the respective vacuum tubes, all of which are symmetrical as to the number of contact fingers and the spacing thereof.

In one embodiment actually tried out in practice, each annular arrangement of contact fingers 18 had thirteen such fingers approximately ¼ inch long and 3/16 inch wide, and spaced about ¼ inch apart. The neutralization means and process described in this and in the preceding paragraph is especially useful in the case of the amplifier of Fig. 1*b* since the input and output cavities are tuned to the same frequency. In one embodiment successfully tried out in practice, the frequency was 530 megacycles.

The frequency of the energy applied to the input transmission line of Fig. 1*a* was of the order of 176 megacycles, while the frequency of the energy appearing on the output transmission line was of the order of 530 megacycles or three times the input frequency. The input cavity resonator tuner 40 should be adjusted to such a point as to maximize the grid current on the tubes, while the output tuner 50 for the output cavity resonator 12 should be adjusted to maximize the power output at a frequency of 530 megacycles. The system of the invention was tried out in a television transmitter, in which eight 4X150A tetrode tubes were arranged as a cluster in a circle around the axis of a cavity resonator structure.

Figure 3:
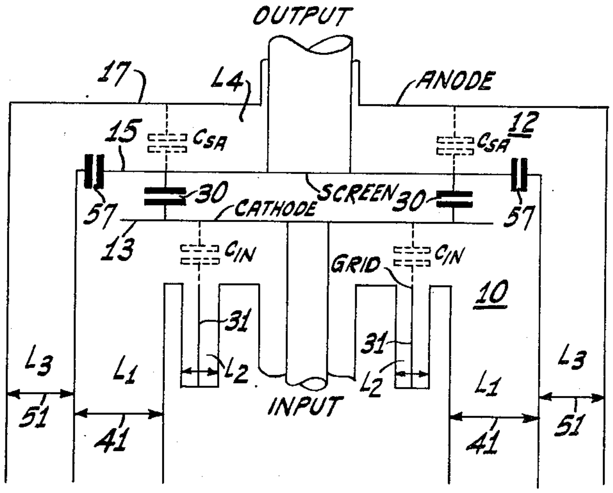
Fig. 3 shows the basic tank configuration of the tripler stage of Fig. 1*a*.

A clearer understanding of the operation of the system of Fig. 1*a* may be had from an inspection of the simplified equivalent basic tank circuit shown in Fig. 3. The output and input tank circuits and their associated circuit elements have been given the same designations as the equivalent parts shown in Fig. 1*a*. The interelectrode capacitances of the tubes appearing between the screen grids and the anodes have been shown in dotted lines and designated $C_{SA}$, while the input capacitances of the vacuum tubes also shown in dotted lines have been designated $C_{IN}$.

The equivalent electrical grid circuit of Fig. 1*a* is shown in Fig. 4*a* in which the inductance coil L1 corresponds to the inductance of the input cavity resonator 10. This is shown adjustable because of the adjustment provided by the slider 41 for the input cavity. The coil L2 in Fig. 4*a* corresponds to the inductance provided by all of the individual grid tuners for the vacuum tubes labeled 14 in Fig. 1a. This coil L2 is shown adjustable in the same manner as the individual tuners 31 are adjustable. The capacitor $C_{IN}$ in series with the coil L2 corresponds to the input capacitances of all of the vacuum tubes, while the resistor R in series with the vacuum tubes represents the grid circuit losses including the losses in the vacuum tube seals. The terminals T represent the location at which the input transmission line is connected.

Fig. 4*c* is the equivalent electrical anode circuit for the output of the system of Fig. 1*a* and also of Fig. 1*b* to be described hereinafter. The coil L4 of Fig. 4*c* corresponds to the portion of the output cavity resonator adjacent the choke joint 43, while adjustable coil L3 represents that portion of the output cavity 12 adjacent the annular output tuner 50. The condenser $C_{SA}$ across both of these coils represents the interelectrode capacitances between the screen grids and the anodes of all of the vacuum tubes. The resistor R1 represents the load or output transmission line.

It should be observed that the tetrode vacuum tubes 14 are of the air cooled type and employ spaced radiator fins 16. Air cooling is provided by forcing air under pressure into the cavity resonator 12 through aperture 59, and this air flows up through the radiator fins in the general direction of the output transmission line. A dielectric or plastic dome 58, such as Plexiglas, surrounds the upper part of the cavity resonator structure and serves the dual purpose of protecting personnel from coming into contact wtih the high voltage applied to the vacuum tube anodes and also to build up a back pressure in the output cavity resonator for enabling the cooling air in the output cavity resonator 12 to flow down through the space between the contact fingers 18 and through the space between the screen disk seal and the socket 19, and thence down around the grid pin G, from which the air flows out through the interior of the input transmission line through suitable apertures.

The multi-tube amplifier of Fig. 1*b* is generally similar in construction to the frequency multiplier or tripler stage of Fig. 1*a* except for certain differences which will now be described.

Individual to the control grid of each tetrode vacuum tube 14 is a choke joint 64 comprising a quarter wavelength concentric transmission line having an inner conductor 65 and an outer conductor 66. This line section 64 is one-quarter wave-length longer at the carrier frequency and is open-ended at one end and short-circuited at its other end. The inner conductor 65 is connected at its free end to the grid pin G, while the closed end of the line section 64 is connected to lead 71 extending to a source of grid bias and video modulation. There are provided as many such choke joints 64 as there are amplifier vacuum tubes 14, with grid bias and video modulation supplied to each vacuum tube through its associated choke joint. It should be noted that the outer conductor of the choke joint 64 is insulated from ground by the dielectric supporting structure 67. The connection 71 between the choke joint and the video modulator may be made at any point on the outer conductor 66.

Whereas the control grid of each vacuum tube in the tripler of Fig. 1*a* is connected to an effective inductance in the form of a grid tuner, the control grid of each vacuum tube in the amplifier of Fig. 1*b* is connected to an effective capacitance in the form of an open-ended transmission line section 60 having an inner conductor 61, an outer conductor 62 and a slidable dielectric plunger 63 movable into the space between the inner and outer conductors thereof. This open-ended transmission line section 60, which is effectively shorter than a quarter wavelength and behaves as a capacitance, resonates with the inductance of the input terminals of the vacuum tube. The lead inductance of the vacuum tube is considerable at the operating frequency of the amplifier (for example, the operating frequency may be 500 megacycles), and the effect thereof is offset by serially connecting with this lead inductance the capacitance of line section 60. The capacitance of the line section 60 is altered by sliding the dielectric plunger 63 a desired amount into the space between metallic conductors 61 and 62.

It will be observed that a modulating signal may be applied to the grids of the vacuum tubes of the amplifier of Fig. 1*b* which are not bypassed to ground at the modulation frequency by the tuning means of the individual grid circuits as is the case in the tripler of Fig. 1*a*. The cavities are normally at D. C. ground potential. The capacitance to ground of the circuit element 61 is quite small so that high frequency modulation, such as a television signal, may be applied directly to the grid terminals of the vacuum tubes without being bypassed to ground.

The equivalent electrical grid circuit of Fig. 1*b* is shown in Fig. 4*b* in which the inductance coil L1 corresponds to the inductance of the input cavity resonator 10 tuned by slider 41; capacitor C1 represents all of the transmission line sections 60 adjustable by motion of the dielectric plungers 63; coil L5 represents the vacuum tube lead inductances of the cathode connection pins and grid terminals of all of the vacuum tubes, and condenser $C_{IN}$ represents the input capacitances of all of the vacuum tubes. The inductance L5 is appreciable at the operating frequency of the power amplifier.

In the embodiment of Fig. 1*b* actually tried out in practice a frequency of 530 megacycles was supplied to the input transmission line IN and the same output frequency of 530 megacycles was taken from the output transmission line OUT. There were eight tetrode vacuum tubes providing a power output of approximately 1 kilowatt.

If desired, the high frequency circuit of the invention can be used as an oscillator of ultra high frequency oscillations. The amplifier of Fig. 1*b* can be changed to an oscillator by providing feedback from the output cavity to the input cavity in any one of a number of ways. The circuit could be made to oscillate by reducing the width and number of the screen grid contact fingers 18. This would produce mutual inductance between the input and output cavities and the circuit would oscillate if the input cavity were operated slightly off-resonance. Similarly, the circuit could be made to oscillate by decreasing the size of bypass capacitance 57. This would introduce a capacitive reactance common to the input and output cavities which would couple these cavities together and enable oscillation. In this case the grid circuit would also be tuned slightly off-resonance. Another method of coupling the input and output cavities together which would allow the circuit of 1*b* to oscillate would be to include an additional aperture in the plates 13 and 15 which separate the input and output cavities. A probe could be inserted through this aperture which would couple the input and output cavities together.

In an ultra-high frequency oscillator it is generally desirable to control both the magnitude and the phase of the feedback. This could be done in the case of Fig. 1*b* by inserting a coupling loop in the output cavity and another in the input cavity. These coupling loops could be connected together with a variable length of coaxial transmission line which would normally be adjusted so that the effective length including the coupling loops is approximately one-half wavelength. The magnitude of the feedback could be controlled by rotating one of the coupling loops which would adjust the amount of energy picked up by this loop. The phase of the feedback could be controlled by adjusting the length of the feedback coaxial transmission line. Either or both of the coupling loops could be replaced by capacitive probes oriented with the axes of the probes parallel to the electric field. In this case the effective length of the coaxial feedback line might be ¾ wavelength.

What I claim is:

1. A high frequency circuit comprising an electrical cavity resonator having a pair of oppositely disposed electrically conducting walls, one of said walls having a number of apertures located symmetrically with respect to the resonator axis, a plurality of vacuum tubes each having an anode, a cathode and a grid, said tubes being mounted in said apertures with the anodes coupled to said one wall at the aperture peripheries, an output coaxial transmission line extending along said axis on one side of said resonator and comprising an inner conductor extending through said one wall of said cavity resonator and an outer conductor connected to and terminating adjacent said one resonator wall, and an intermediate conductor spaced from and coaxial with said outer and inner conductors and overlapping said inner conductor by an effective length of one quarter wave at the mean operating frequency, said intermediate conductor making contact with the other of said walls, and an input coaxial transmission line extending along said axis on the other side of said resonator and having an inner conductor coupled to said cathodes and an outer conductor coupled through individual tunable coaxial line sections to said grids, said resonator having an effective radius of one-half wavelength at the mean operating frequency as measured from the inner conductor of said output line to the resonator periphery, said anodes being coupled to but insulated from said one wall on a circle whose diameter is approximately the geometric mean between the diameters of the cavity resonator and the output transmission line.

2. An amplifier comprising an electrical cavity resonator having a pair of oppositely disposed electrically conducting walls, one of said walls having a number of apertures located symmetrically with respect to the resonator axis, a plurality of vacuum tubes each having an anode, a cathode and a grid, said tubes being mounted in said apertures with the anodes coupled to said one wall at the aperture peripheries, individual tunable coaxial line sections for said grids symmetrically arranged around and parallel to said resonator axis, an output coaxial transmission line extending along said axis on one side of said resonator and comprising an inner conductor extending through said one wall of said cavity resonator and an outer conductor connected to said one resonator wall, and an input coaxial transmission line extending along said axis on the other side of said resonator and having an inner conductor coupled to said cathodes and an outer conductor coupled to said grids through said individual tunable coaxial line sections, said resonator having an effective radius of one-half wavelength at the mean operating frequency as measured from the inner conductor of said output line to the resonator periphery, said anodes being coupled to but insulated from said one wall on a circle whose diameter is approximately the geometric mean between the diameters of the cavity resonator and the output transmission line, said individual tunable grid coaxial line sections being electrically open-ended at the ends remote from said grids and constituting effective capacitances which resonate with the inductances of the grid leads, each of said grid leads being connected to a choke joint through which modulation is applied thereto.

3. A frequency multiplier comprising an electrical cavity resonator having a pair of oppositely disposed electrically conducting walls, one of said walls having a number of apertures located symmetrically with respect to the resonator axis, a plurality of vacuum tubes each having an anode, a cathode and a grid, said tubes being mounted in said apertures with the anodes coupled to said one wall at the aperture peripheries, individual tunable coaxial line sections for said grids symmetrically arranged around and parallel to said resonator axis, an output coaxial transmission line extending along said axis on one side of said resonator and comprising an inner conductor extending through said one wall of said cavity resonator and an outer conductor connected to said one resonator wall, and an input coaxial transmission line extending along said axis on the other side of said resonator and having an inner conductor coupled to said cathodes and an outer conductor coupled to said grids through said individual tunable coaxial line sections, said resonator having an effective radius of one-half wavelength at the mean operating frequency as measured from the inner conductor of said output line to the resonator periphery, said anodes being coupled to but insulated from said one wall on a circle whose diameter is approximately the geometric mean between the diameters of the cavity resonator and the output transmission line, said individual tunable grid line sections being electrically closed at the ends remote from the grids and constituting effective inductances, each grid coaxial line section having a tuning slider effectively shunting the inner and outer conductors of said line section.

4. A high frequency circuit comprising a cavity resonator construction having a pair of flat electrically conducting circular walls and an intermediate flat electrically conducting circular wall, all three walls being physically parallel to and spaced from one another and of progressively decreasing diameters with one outer wall of said pair being the smallest, three electrically conducting cylinders arranged parallel to and spaced from one another connected to and defining the bounds of said three flat circular walls, said cylinders extending in one direction only from said flat walls and electrically connected at their ends farthest removed from said flat walls to thereby define input and output resonators having a common intermediate flat wall, individual annular tuning sliders for said pair of resonators, the larger outer wall of said pair having a plurality of apertures located symmetrically with respect to the resonator axis extending parallel to the cylinders, a plurality of vacuum tubes each having an anode, a cathode, a screen electrode and a control grid, said tubes being mounted in said apertures with the anodes being coupled to but insulated from the larger wall at the aperture peripheries, and with the other electrodes entering into the interior of said cavity resonator construction, said intermediate flat wall and said smaller outer wall having apertures registering with the aforesaid apertures in said larger outer wall, annular contact springs surrounding the apertures in said intermediate flat wall and contacting said screen electrodes, individual tunable coaxial line sections closing the apertures of said smaller outer wall and coupled to said control grids, an output coaxial transmission line extending along said resonator axis on one side of said resonator construction and comprising an inner conductor extending through the larger flat wall and effectively terminating at the intermediate flat wall and an outer conductor connected to said larger flat wall, and an input coaxial transmission line extending along said resonator axis on the other side of said resonator construction and comprising an inner conductor extending through the smaller flat wall and connected to said cathodes and an outer conductor connected to said smaller flat wall.

5. An ultra high frequency circuit in accordance with claim 4, in which said output resonator has an effective radius of one-half wavelength at the mean operating frequency as measured from the output transmission line to the point on the outer cylinder in contact with its annular tuning slider, said anodes making contact with said larger wall on a circle whose diameter is approximately the geometric mean between the diameters of the output cavity resonator and the output transmission line.

6. In combination, an electrical resonator construction comprising input and output cavity resonators having a common wall therebetween, the outer wall of said output resonator having a plurality of apertures symmetrically located with respect to the axis of said resonators, a plurality of vacuum tubes each havinig an anode and a grid, said tubes being mounted in said apertures with the anodes being coupled to but insulated from said one outer wall at the aperture peripheries and with the grids and cathodes entering into the interior of the resonator construction, said common wall having apertures registering with the aforesaid apertures, said common wall being provided at each of its apertures with annular spaced contact fingers contacting one of said grids, said contact fingers being limited in number with spacings between said fingers larger than the width of said fingers to produce an inductive reactance in said wall of such value to neutralize the capacitive coupling between the cavity resonators due to the unavoidable interelectrode capacitances of the vacuum tubes, and input and output transmission lines coupled to said respective input and output cavities.

7. A high frequency circuit in accordance with claim 1, characterized in this, that the conductors of said input coaxial transmission line are widened in diameter at the location of said cavity resonator in order to terminate said input line as closely as possible to the electrode terminals of the vacuum tubes.

8. In combination, an electrical resonator construction comprising input and output cavity resonators having a common wall therebetween, said common wall including an aperture therethrough, a vacuum tube supported in the aperture in said common wall, said common wall being provided at said aperture with circularly spaced contact fingers for engaging an electrode of said tube, said fingers being limited in number with spacings between said fingers larger than the width of said fingers to produce an inductive reactance of such value to neutralize the capacitive coupling between the cavity resonators due to the unavoidable interelectrode capacitances of said tube.

References Cited in the file of this patent

UNITED STATES PATENTS

| | | |
|---|---|---|
| 2,284,405 | McArthur | May 26, 1942 |
| 2,372,228 | Schelkunoff | Mar. 27, 1945 |
| 2,404,261 | Whinnery | July 16, 1946 |
| 2,412,805 | Ford | Dec. 17, 1946 |
| 2,415,962 | Okress | Feb. 18, 1947 |
| 2,421,635 | McArthur | June 3, 1947 |
| 2,428,622 | Gurewitsch | Oct. 7, 1947 |
| 2,527,979 | Woodward, Jr. | Oct. 31, 1950 |
| 2,554,500 | Preist | May 29, 1951 |
| 2,554,501 | Preist | May 29 1951 |